US009678200B2

(12) United States Patent
Lange et al.

(10) Patent No.: US 9,678,200 B2
(45) Date of Patent: Jun. 13, 2017

(54) SCATTERED LIGHT REFERENCE PIXEL

(71) Applicant: PMDTechnologies GmbH, Siegen (DE)

(72) Inventors: Robert Lange, Netphen (DE); Martin Albrecht, Freudenberg (DE)

(73) Assignee: PMDTechnologies GmbH, Siegen (DE)

( * ) Notice: Subject to any disclaimer, the term of this patent is extended or adjusted under 35 U.S.C. 154(b) by 0 days.

(21) Appl. No.: 14/910,387

(22) PCT Filed: Aug. 12, 2014

(86) PCT No.: PCT/EP2014/067208
§ 371 (c)(1),
(2) Date: Feb. 5, 2016

(87) PCT Pub. No.: WO2015/024811
PCT Pub. Date: Feb. 26, 2015

(65) Prior Publication Data
US 2016/0178737 A1 Jun. 23, 2016

(30) Foreign Application Priority Data
Aug. 21, 2013 (DE) .................. 10 2013 109 020

(51) Int. Cl.
*G01S 7/497* (2006.01)
*G01S 17/36* (2006.01)
(Continued)

(52) U.S. Cl.
CPC ............ *G01S 7/497* (2013.01); *G01S 7/4914* (2013.01); *G01S 17/36* (2013.01); *G01S 17/89* (2013.01)

(58) Field of Classification Search
CPC ........ G01S 17/08; G01S 17/023; A01J 5/017; A01J 5/007; Y10S 901/09; Y10S 901/47; Y10S 901/41
See application file for complete search history.

(56) References Cited

U.S. PATENT DOCUMENTS

| 4,960,996 A | 10/1990 | Hochstein |
| 2005/0200833 A1 | 9/2005 | Nakamura et al. |

(Continued)

FOREIGN PATENT DOCUMENTS

| CN | 101783150 | 7/2010 |
| CN | 102741702 | 10/2012 |

(Continued)

OTHER PUBLICATIONS

Dorrington, A. A. et al.: "Separating true range measurements from multi-path and scattering interference in commercial range cameras", Proceedings of SPIE-IS&T Electronic Imaging, 2011, SPIE vol. 7864, pp. 786404-1-786404-10.

*Primary Examiner* — Luke Ratcliffe
(74) *Attorney, Agent, or Firm* — Marsh Fischmann & Breyfogle LLP; Jonathon A. Szumny

(57) ABSTRACT

The present invention relates to an apparatus for determining an intensity and/or a phase of intensity modulation of an intensity-modulated electromagnetic radiation signal, having a detector and imaging optics for imaging an intensity-modulated radiation signal onto the detector. In comparison with this, the present invention addresses the problem of providing an apparatus for reducing scattered light influences on an intensity and/or phase determination of the intensity modulation of an intensity-modulated electromagnetic radiation signal. In order to solve this problem, the invention proposes configuring the apparatus of the type mentioned at the outset in such a manner that said apparatus has at least one scattered light reference pixel, which is arranged outside an imaging section of the imaging optics and is set up in such a manner that said pixel records measured values for an intensity-modulated scattered light signal during operation, and a determination device which is set up in such a manner that said determination device processes measured values from at least one pixel in a pixel (Continued)

matrix of the detector inside the imaging section as a first data input and measured values from at least one scattered light reference pixel as a second data input during operation in such a manner that said determination device determines a corrected intensity of the intensity-modulated radiation signal and/or a corrected relative phase between the intensity modulation of the intensity-modulated radiation signal and a reference signal at least for the pixel inside the imaging section and provides said intensity and/or phase as a data output.

20 Claims, 3 Drawing Sheets

(51) Int. Cl.
*G01S 17/89* (2006.01)
*G01S 7/491* (2006.01)

(56) References Cited

U.S. PATENT DOCUMENTS

| | | |
|---|---|---|
| 2010/0182663 A1 | 7/2010 | Yamakawa |
| 2011/0149071 A1 | 6/2011 | Oggier |
| 2011/0199349 A1 | 8/2011 | Katoh |
| 2011/0248151 A1 | 10/2011 | Holcombe et al. |
| 2015/0122183 A1* | 5/2015 | Oggier .................. G01S 7/497 119/14.08 |

FOREIGN PATENT DOCUMENTS

| | | |
|---|---|---|
| DE | 3930632 A1 | 3/1991 |
| DE | 19704496 A1 | 3/1998 |
| DE | 19821974 A1 | 11/1999 |
| DE | 102004016624 A1 | 10/2005 |
| DE | 102005046989 A1 | 4/2006 |
| EP | 2017651 A2 | 1/2009 |
| WO | 02/31455 A1 | 4/2002 |
| WO | 2011/084799 A1 | 7/2011 |

* cited by examiner

SCATTERED LIGHT REFERENCE PIXEL

The present invention concerns an apparatus for determining an intensity and/or a phase of an intensity modulation of an intensity-modulated electromagnetic radiation signal, comprising a detector, wherein the detector has a pixel matrix, and an imaging optical means for imaging an intensity-modulated radiation signal onto the detector, wherein the imaging optical means in operation illuminates an imaging portion of the detector with the imaged intensity-modulated radiation signal and wherein the pixel matrix is arranged at least portion-wise within the imaging portion of the detector and has a plurality of pixels which are so adapted that in operation they record measurement values for the intensity-modulated radiation signal.

The present invention also concerns a method of reducing scattered light influences on intensity and/or phase determination of the intensity modulation of an intensity-modulated electromagnetic radiation signal, comprising the steps: imaging the intensity-modulated radiation signal onto a detector, wherein the imaging optical means illuminates an imaging portion of the detector with the imaged intensity-modulated radiation signal, recording the imaged intensity-modulated radiation signal with a pixel matrix of the detector, wherein the pixel matrix of the detector is arranged at least portion-wise within the imaging portion and has a plurality of pixels which are so adapted that in operation they record measurement values for the intensity-modulated radiation signal.

Such apparatuses and methods are used for example in distance measurement operations by means of determining the transit time of an intensity-modulated electromagnetic signal. In that case a transmitter at a known position relative to the apparatus for determining the intensity and/or relative phases of the intensity modulation of an intensity-modulated radiation signal, that is to say the apparatus for intensity and/or phase determination, emits a corresponding intensity-modulated electromagnetic signal. That signal is reflected or scattered by objects in the area around the transmitter, that is acted upon with the intensity-modulated radiation, and in that case such signal is deflected inter alia in the direction of the apparatus for determining intensity and/or phase.

In general in that case the incident intensity-modulated radiation signal is overlaid by background radiation which does not involve any intensity modulation or modulation at other frequencies. By means of the apparatus for determining intensity and/or phase the reflected intensity-modulated signal is selectively filtered out of the incident radiation for example by means of correlation and recorded using a reference signal. For that purpose the apparatus for determining intensity and/or phase is subjected to the effect of an intensity-modulated voltage or current signal as a reference signal.

A rigid-phase correlation between the modulated voltage or current signal as the reference signal and the intensity modulation of the radiation signal is particularly advantageous for detecting and determining intensity and/or relative phase of the intensity modulation of an intensity-modulated electromagnetic radiation signal. In general, to simplify detection, the same frequencies and/or signals are adopted for the reference signal and the intensity modulation. In that case the modulation signal can have any periodic structure, in particular for example a sine or cosine or however also quasi-periodic structure.

In relation to the radiation signal to be detected, on the one hand its intensity or amplitude and on the other hand its relative phase or phase shift, more precisely the relative phase shift, of the intensity modulation of the detected radiation signal, is ascertained with respect to the reference signal. The phase relationship between reference signal and the intensity modulation of the intensity-modulated radiation signal upon emission by the transmitter is presumed in that case to be known. The phase shift in the detected radiation signal with respect to the radiation signal upon emission is based on the time required by the radiation signal to cover the travel distance from the transmitter by way of the reflecting or scattering object to the apparatus for determining intensity and/or phase. With a known speed of propagation of the radiation signal, in general this being the speed of light, the travel distance covered can be calculated from that transit time. With the known relative position of transmitter and apparatus for determining intensity and/or phase, the distance of the reflecting or scattering object is deduced from that travel distance.

Such a general method of determining amplitude and relative phase of the intensity modulation of an intensity-modulated radiation signal is known for example from DE 198 21 974 A1. That method, for detecting and determining an incident intensity-modulated radiation signal, uses for example a semiconductor component in accordance with DE 10 2004 016 624 A1. DE 10 2004 016 624 A1 describes a so-called photomixing detector element (PMD element). In that case photons of the electromagnetic radiation incident on the semiconductor component are converted into charge carriers within a photoconductive layer of the semiconductor component.

In general the incident electromagnetic radiation comprises an intensity-modulated radiation signal and uncorrelated background or ambient radiation. Accordingly only a part of the charge carriers is produced by photons of the intensity-modulated radiation signal contained in the incident electromagnetic radiation. In that respect the number of charge carriers generated by an electromagnetic signal in the semiconductor component is proportional to the intensity of the signal. For detecting and determining the amplitude and/or the relative phase shift of the intensity modulation of the radiation signal those charge carriers which are generated by the intensity-modulated radiation signal are filtered in specifically targeted fashion out of the total number of charge carriers generated. For that purpose the semiconductor component has a so-called charge swing. The term charge swing is used here to denote a photoconductive layer for converting incident photons into charge carriers, which is acted upon with a modulated voltage signal or a modulated voltage difference. The modulated voltage difference between different regions of the photoconductive semiconductor layer provides that the generated charge carriers are displaced along the potential gradient and are collected in the regions with a relative potential minimum. The charge carriers collected in the different regions of the photoconductive semiconductor layer are read out during the displacement or following same in respect of time. The generated charge carriers are therefore firstly displaced in accordance with a reference signal in the form of a modulated voltage signal or mixed therewith. The displaced or mixed charge carrier amounts are then integrated, thereby producing as measurement values electric signals which are correlated with the intensity modulation of the intensity-modulated radiation signal.

The uncorrelated background radiation is statistically averaged out by difference formation between the signals read out in the different regions of the photoconductive semiconductor layer. Unrelated background radiation means the proportion of charge carriers which were generated by such electromagnetic radiation which does not have any rigid-phase correlation with the modulated voltage signal. The difference signal resulting therefrom is substantially both proportional to the intensity of the incident intensity-modulated radiation signal and also to the phase shift in intensity modulation relative to the modulation voltage or the reference signal. With a known phase difference between reference signal and intensity modulation signal the phase shift of the intensity modulation can be determined, which is based on the distance covered by the reflected signal and the transit time linked thereto.

In the simplest case that general method of determining distance by means of transit time measurement of an intensity-modulated electromagnetic signal is based on the assumption that the intensity-modulated signal detected by the apparatus for determining intensity and/or phase has been reflected on its way or along its path from the transmitter to the apparatus for determining intensity and/or phase, only once at the object whose distance is determined or is to be determined.

By means of the imaging optical means, the incident electromagnetic radiation and in particular the incident intensity-modulated radiation signal is imaged and focused on to the imaging portion of the detector and thus on to the pixel matrix. Imaging here and hereinafter means targeted projection in accordance with the general rules of the lens equation or optics. In that respect the aim is as far as possible to ensure a correlation such that an image portion of the ambient scene to be detected or the object to be detected corresponds to each pixel of the pixel matrix within the imaging portion of the detector. Accordingly, in the case of an ideal imaging optical means, a unique image portion with a unique distance value should correspond to each pixel. In general however problems can arise in practice if intensity-modulated radiation signals which have covered different travel distances are deflected on to one and the same pixel, thereby producing hybrid phases. Such hybrid phases lead to errors in distance measurement. Such hybrid phases can occur when the radiation signal which is reflected only once and which covers the shortest distance from the transmitter by way of the reflecting object to the detection device is overlaid by further signals which, by way of a plurality of reflections, follow a different path, in that case at the end however are deflected on to the same pixel and are thus associated with the same image portion. That is referred to as multi-path propagation. As a result, there is a phase position in respect of the detected modulation, which corresponds to a superpositioning of many different individual phase positions of the individual beam paths involving different lengths. Of those different individual phase positions however only one corresponds to the correct distance.

Such multi-path propagation is particularly problematical when a superimposing signal is of a great amplitude, for example when a multiple-reflected signal covers a substantially shorter distance than the radiation signal which is reflected only once. As a consequence of the shorter travel distance the intensity losses of such a multiple-reflected radiation signal, in spite of the larger number of reflections, can be less than those of the signal which is reflected once. The result of this is that the detected radiation signal is dominated by the proportion of the multiple-reflected signal and a shorter distance than the actual distance is determined for the object. Such problems can occur for example when an object at a short distance from the imaging optical means is disposed outside that region which in the case of ideal imaging optical means would be the region which is exclusively imaged. That region which in the ideal case is exclusively imaged represents the field of view of the apparatus and is generally also referred to as the FOV. Electromagnetic radiation which is reflected by an object outside the FOV passes on to a pixel of the pixel matrix within the imaging portion therefore only in the case of a non-ideal imaging optical means. If the reflected radiation is scattered for example by the edge of the imaging optical means on to a pixel within the imaging portion then it overlies other radiation signals imaged by the imaging optical means. It is precisely by virtue of the short distance of the reflecting object that in that case the error occurring due to that superimpositioning can be significant.

Dorrington, A. A. et al "Separating true range measurements from multi-path and scattering interference in commercial range cameras", Proc. SPIE 7864, 2010 proposed, in the case of such multi-path propagation by way of a plurality of paths, implementing measurements with a plurality of different intensity modulation frequencies and mathematically or numerically calculating therefrom the correct distance value or approximating same. It will be noted that for that purpose an equation system has to be solved, which cannot be solved in closed form and which accordingly is to be iteratively minimized. That approach is very computation- and thus also time-intensive and is accordingly not suitable for real-time applications.

The described problem involving multi-path propagations occurs in particular in the special form of scattered light signals. The term scattered light signal is used here and hereinafter to denote an intensity-modulated electromagnetic radiation signal which propagated within the imaging optical means, in such a way that it is deflected by the imaging optical means on to apparatus portions and in particular pixels of the pixel matrix, that is to say it is scattered, which do not correspond to the reflection or propagation direction of the radiation signal in the case of ideal lens properties of the imaging optical means. A scattered light signal can occur for example by virtue of scattering of the radiation signal at the edges of the imaging optical means and/or by virtue of non-ideal imaging properties of the imaging optical means. The occurrence of a scattered light signal is particularly problematical insofar as it is an apparatus-inherent property which accordingly can occur in any measurement by means of a non-ideal apparatus for determining intensity and/or phase, the imaging optical means of which is not ideal or flawed. The result of this is that scattered light signals can occur even when, by virtue of the scenery to be measured, it is actually to be assumed that multi-path propagation should be excluded. Even when surveying simple and easily manageable scenes with for example only one object whose distance is to be determined, problems with scattered light signals can occur as scattered light can also result from regions outside the FOV.

Accordingly the object of the present invention is to provide an apparatus for and a method of reducing scattered light influences on intensity and/or phase determination of the intensity modulation of an intensity-modulated electromagnetic radiation signal, with which in particular errors in determining distance by virtue of scattered light signals can be prevented or reduced.

That object is attained in that the apparatus set forth in the opening part of this specification has at least one scattered light reference pixel arranged outside the imaging portion of the detector and so adapted that in operation it records measurement values for an intensity-modulated scattered light signal, and a determining device so adapted that in operation it processes measurement values from at least one pixel of the pixel matrix within the imaging portion as a first data input and measurement values from at least one scattered light reference pixel as a second data input in such a way that in a first determining step it determines from the first data input an intensity for the intensity-modulated radiation signal and/or a relative phase between the intensity modulation of the intensity-modulated radiation signal and a reference signal at least for the pixel within the imaging portion and from the second data input an intensity of the intensity-modulated scattered light signal and/or a relative phase between the intensity modulation of the intensity-modulated scattered light signal and the reference signal at least for the scattered light reference pixel and in a second determining step it offsets the determination result of the first determining step with each other in such a way that the determining device provides a corrected intensity of the intensity-modulated radiation signal and/or a corrected relative phase between the intensity modulation of the intensity-modulated radiation signal and a reference signal at least for the pixel within the imaging portion and provides it as a data output, and/or the determining device processes the data inputs in such a way that in a first determining step it offsets the data inputs with each other in such a way that it determines corrected measurement values at least for the pixel within the imaging portion and in a second determining step determines from the corrected measurement values of the first determining step a corrected intensity of the intensity-modulated radiation signal and/or a corrected relative phase between the intensity modulation of the intensity-modulated radiation signal and a reference signal at least for the pixel within the imaging portion and provides it as a data output.

The term intensity modulation in accordance with the present invention obviously also includes constant intensity patterns. Accordingly inter alis signals with a constant intensity are also interpreted as intensity-modulated radiation signals.

The imaging optical means is adapted to image or focus an incident electromagnetic radiation signal exclusively on to the imaging portion of the detector and the pixels of the pixel matrix, that are within the imaging portion. Accordingly in the case of an ideal imaging optical means, no electromagnetic radiation and in particular no intensity-modulated electromagnetic radiation which by virtue of its modulation frequency is identified as an intensity-modulated radiation signal should be deflected or scattered on to the scattered light reference pixel according to the invention, which is disposed at a suitable location outside the imaging portion. If nonetheless an intensity-modulated radiation signal is detected by the scattered light reference pixel that signifies that the imaging optical means is not ideal and scattered light is present. In that case the intensity-modulated radiation signal is scattered for example at edges of the imaging optical means and/or by virtue of non-ideal imaging properties thereof on to an apparatus portion outside the imaging portion.

Recording measurement values for the intensity and/or phase of the intensity modulation of an intensity-modulated radiation signal in accordance with the present invention signifies conversion of the information contained in the electromagnetic radiation into electrical information. Thus the information contained in the photon distribution of the incident radiation about the intensity and phase of the intensity modulation is respectively converted by the pixels within the imaging portion and the scattered light reference pixel into information contained in a charge carrier distribution about the intensity and phase of the intensity modulation. In that respect those charge carrier distributions generated by the pixels and the scattered light reference pixel and processed by the determining device represent the measurement values of the pixels and the scattered light reference pixel.

In comparison determining the intensity and/or phase of the intensity modulation of an intensity-modulated radiation signal signifies electronic evaluation of the charge carrier distributions or measurement values by calculation of specific values for the intensity and/or phase of the intensity modulation of an intensity-modulated radiation signal corresponding to those measurement values. For such a calculation, over and above the pixels and the scattered light reference pixel, further technical prerequisites are needed which according to the invention are provided by a determining device.

In general a scattered light signal, as the name indicates, is diffusely deflected at the same time in various directions. Consequently in a first approximation it is to be assumed that differences in homogeneity in intensity distribution of such a scattered light signal are slight. Accordingly the scattered light signal measured by a scattered light reference pixel according to the invention and in particular based thereon linear extrapolations or interpolations for all pixels of the pixel matrix in the first order represents a good approximation for the error when determining the intensity-modulated radiation signal which occurs by virtue of scattered light signals.

In particular in that case a scattered light reference pixel according to the invention serves as an indicator for the presence of scattered light errors or a need for scattered light correction. The scattered light is shown for example in black-white errors (B/W-errors) in the distance image. The term B/W-error here and hereinafter means primarily the distance error.

If, besides the actual reflection and imaging of the intensity-modulated radiation signal from the scene to be detected on to a pixel within the imaging portion, a scattered light signal additionally occurs, with which the pixel is acted upon at the same time as a consequence of a scatter effect, then both signals are superposed in the pixel both in the amplitude of intensity modulation, that is to say brightness, and also in the phase of the intensity modulation, which results in a hybrid phase. In the case of signals of sine or cosine form, superimpositioning of the signals is effected in accordance with the corresponding trigonometric addition theorems. That also applies to a rectangular signal which in known fashion can be approximated and analyzed in the Fourier spectrum as the superimposition of a plurality of harmonic individual oscillations. Besides the phase difference between the superposed signals the resulting hybrid phases are dependent in particular on the amplitude difference, that is to say brightness difference, between the scattered light signal and the radiation signal with correct distance information or the useful signal. Weak signals are more greatly influenced by the scattered light signal than strong signals. For that reason here and hereinafter reference is made to a B/W-error in connection with the scattered light signal.

Only the overall amplitude and the relative hybrid phase of the superposed intensity modulations can be determined by means of a pixel of the pixel matrix, that is affected by the B/W-error. If however the scattered light is known from an additional measurement, like that with a scattered light reference pixel according to the invention, then the measurement values which are affected by error of the pixels within the imaging portion or the amplitudes detected thereby as well as phase differences in the intensity modulation can be corrected. Thus corresponding error-free values are reconstructed without scatter phenomena and B/W-errors.

In this respect there are in principle two possible correction methods. On the one hand correction of the individual measurement values of the individual pixels within the imaging portion can be effected by subtraction of values which are determined from the measurement values of the at least one scattered light reference pixel. Corrected intensities and/or correct relative phases can then be determined from those corrected measurement values. On the other hand however it is equally conceivable for firstly a respective intensity and/or relative phase for the individual pixels within the imaging portion and the at least one scattered light reference pixel to be determined from the detected measurement values. Then the intensities and/or relative phases of the individual pixels within the imaging portion are corrected by subtraction of intensities and/or relative phases which are determined on the basis of the intensity and/or relative phase for the at least one scattered light reference pixel. In that case both the operation of determining the intensities and/or relative phases for the subtraction process and also the subtraction process itself is effected in accordance with applicable addition theorems.

In an embodiment of the present invention the scattered light reference pixel is arranged spaced from the pixel matrix. In real imaging optical means focusing is never ideal. Accordingly the boundary between the imaging portion of the detector, on to which the intensity-modulated electromagnetic radiation signal is imaged, and immediately adjoining detector or apparatus portions which would be dark without the scattered light signal is also never absolutely sharp. Accordingly it can easily happen that a scattered light reference pixel directly adjoining the pixel matrix and the imaging portion of the detector, that is to say whose spacing relative to the pixel matrix is in that case negligible, also records a signal in the case of the absence of scattered light signals. It will be noted however that that signal is only based on a locally severely limited scattering or non-ideal focusing of the incident radiation, in contrast to a scattered light signal in accordance with the present invention.

A scattered light signal in accordance with the present invention involves in particular a scattered intensity-modulated radiation signal which is scattered over a large area in dimensions of the imaging portion of the detector. In other words the scattering surface on to which the signal is scattered is of an order of magnitude which is at least comparable to or even larger than the size of the imaging portion. Therefore extrapolation or interpolation of the superposed signal, based on the measurement of a scattered light reference pixel which immediately adjoins the pixel matrix or whose spacing is negligible, can ascertain an extrapolated or interpolated B/W-error which locally markedly differs from the actual scattered light signal. That danger can be avoided by means of a sufficiently spaced scattered light reference pixel.

In an embodiment the scattered light reference pixel is arranged outside the plane in which the pixel matrix is arranged. That has the advantage that the scattered light reference pixel can be arranged at any position within the apparatus. In particular, in regard to the design configuration of the apparatus, there is thus no need to provide additional space for the scattered light reference pixel. Rather, the scattered light reference pixel is arranged for example where there is already sufficient space. If the scattered light reference pixel is arranged outside the plane in which the pixel matrix is arranged then the spacing of the scattered light reference pixel from the plane of the pixel matrix possibly also has to be taken into consideration in the correction operation, in dependence on the desired accuracy for correction of the radiation signals.

In an embodiment the scattered light reference pixel is arranged at the imaging optical means. The scattered light reference pixel can thus be arranged in space-saving relationship in the apparatus. Particularly when it is arranged perpendicularly to the pixel matrix in such a way that it views inwardly into the imaging optical means. A plurality of such scattered light reference pixels is also conceivable, which for example are arranged on a circle around the imaging optical means and facing towards each other view inwardly into the imaging optical means.

In a further embodiment the scattered light reference pixel and the pixel matrix are arranged in the same plane. That has the advantage that the extrapolation or extrapolation of correction values for the intensity and/or relative phase recorded by the pixels of the pixel matrix within the imaging portion is effected two-dimensionally.

In an embodiment the pixel matrix has a first portion within the imaging portion and a second portion outside the imaging portion, wherein at least one of the pixels within the second portion is a scattered light reference pixel. In that case in particular a pixel matrix is used, which is larger than the imaging portion of the detector. Individual ones or all pixels of the pixel matrix outside the imaging portion can be used in that case as scattered light reference pixels.

In an embodiment of this invention there is provided a plurality of scattered light reference pixels. A plurality of scattered light reference pixels makes it possible for the scattered light reference pixels to be arranged at different positions of the detector or to ascertain scattered light signal values for a larger region. Accordingly the scattered light signal distribution can be better detected and more accurate intensities and/or relative phases of the intensity modulation of the intensity-modulated scattered light signal are extrapolated or interpolated. In general terms correction of the individual measurement values of the individual pixels within the imaging portion is also effected in that case by the subtraction of values which are interpolated or extrapolated from the measurement values of the scattered light reference pixels. In that respect however it is also conceivable that once again firstly a respective intensity and/or relative phase for individual pixels within the imaging portion and the scattered light reference pixels is determined from the detected measurement values. Then the intensities and/or relative phases of the individual pixels are corrected by the subtraction of interpolated or extrapolated intensities and/or relative phases, having regard to addition theorems, which are interpolated or extrapolated from the intensities and/or relative phases of the scattered light reference pixels.

In an embodiment of the present invention the scattered light reference pixels are arranged along the periphery of the pixel matrix. That makes it possible for the scattered light to be detected or interpolated or extrapolated as uniformly as possible for the entire pixel matrix.

In a further embodiment a scattered light reference pixel is arranged at least at a corner of the pixel matrix and/or at least one center point of a side of the pixel matrix. Such a distribution makes it possible for the scattered light to be ascertained as uniformly as possible in the actual pixel matrix, even with a small number of scattered light reference pixels.

According to the invention in an embodiment the scattered light reference pixels are arranged distributed at equal angular spacings about the center point of the pixel matrix. The center point of the pixel matrix here and hereinafter corresponds to the centroid of the pixel matrix. A distribution at equal angular spacings is favorable in particular for uniform recording of scattered light signals, whereby signal superimposition can be correspondingly more accurately corrected. Such an arrangement is suitable in particular for the above-described case involving a plurality of scattered light reference pixels arranged on a circle at the imaging optical means.

In a further embodiment the pixel matrix is rectangular in plan view and an identical number of scattered light reference pixels is arranged at respective opposite sides of the pixel matrix. Such an equally distributed arrangement in regard to oppositely disposed sides also leads to uniform recording of the scattered light signal. In an embodiment the pixel matrix is square in plan view and a respective equal number of scattered light reference pixels is arranged at all sides of the pixel matrix. In that respect, besides a symmetrical arrangement of the scattered light reference pixels, the highly symmetrical configuration of the pixel matrix also promotes interpolation or extrapolation of the scattered light signal, that is as precise as possible.

In an embodiment the scattered light reference pixels are arranged in spatially mutually adjoining relationship. With such an arrangement the scattered light signal and its distribution around the pixel matrix can be almost completely recorded and in particular it is thus possible to ascertain how homogeneously the scattered light signal is actually distributed. Accordingly, based on corresponding homogeneity evaluation, it is possible to estimate what quality a scattered light error correction of the first order by means of the measurement values detected by the scattered light reference pixels actually has.

In a further embodiment the scattered light reference pixels are arranged in spatially mutually adjoining relationship along the entire periphery of the pixel matrix in such a way that they completely enclose the periphery of the pixel matrix. In that case it is possible to implement complete ascertainment, as accurately as possible, of the scattered light signal and its distribution around the pixel matrix and around the imaging portion of the detector.

Furthermore the above-mentioned object is also attained by a method as set forth in the opening part of this specification, which has the following additional steps: recording an intensity-modulated scattered light signal with at least one scattered light reference pixel of the apparatus, on to which the intensity-modulated scattered light signal is scattered, wherein the scattered light reference pixel is arranged outside the imaging portion of the detector and is so adapted that in operation it records measurement values for the intensity-modulated scattered light signal, and determining a corrected intensity of the intensity-modulated radiation signal and/or a corrected relative phase between the intensity modulation of the intensity-modulated radiation signal and a reference signal for at least one pixel of the pixel matrix within the imaging portion, wherein the determining operation includes a first determining step in which an intensity for the intensity-modulated radiation signal and/or a relative phase between the intensity modulation of the intensity-modulated radiation signal and a reference signal at least for the pixel within the imaging portion is determined at least from the measurement values from the pixel within the imaging portion and an intensity of the intensity-modulated scattered light signal and/or a relative phase between the intensity modulation of the intensity-modulated scattered light signal and the reference signal at least for the scattered light reference pixel is determined at least from the measurement values from a scattered light reference pixel, and a second determining step in which the determining results of the first determining step are so offset with each other that a corrected intensity of the intensity-modulated radiation signal and/or a corrected relative phase between the intensity modulation of the intensity-modulated radiation signal and a reference signal at least for the pixel within the imaging portion is determined, and/or wherein the determining operation includes a first determining step in which at least the measurement values from the pixel within the imaging portion and at least the measurement values from the scattered light reference pixel are so offset with each other that corrected measurement values at least for the pixel within the imaging portion are determined, and a second determining step in which a corrected intensity of the intensity-modulated radiation signal and/or a corrected relative phase between the intensity modulation of the intensity-modulated radiation signal and a reference signal at least for the pixel within the imaging portion is determined from the corrected measurement values of the first determining step.

In such a method of evaluating the information recorded by the scattered light reference pixels about the scattered light signal and corresponding further processing thereof the individual measurement values of the individual pixels within the imaging portion are corrected by approximations of the first order for the scattered light based on the measurement values recorded by the scattered light reference pixels. That method generally represents a good first-order scattered light signal correction. In turn the correction can be effected either directly by offsetting of the measurement values of pixels within the imaging region with values based on the measurement values of at least one scattered light reference pixel, or intensities and/or relative phases are respectively determined firstly based on the measurement values of the pixels within the imaging region and the at least one scattered light reference pixel, which intensities and/or relative phases are then offset with each other having regard to corresponding, in particular trigonometric addition theorems.

The term correction in accordance with the invention is used to denote both adjustment of the measurement values recorded by the pixels within the imaging portion in respect of the intensity and/or relative phase of the intensity modulation of the intensity-modulated radiation signal, and also alternatively adjustment of the intensities and/or relative phases, determined for the pixels within the imaging portion, in respect of the intensity modulation of the intensity-modulated radiation signal. In that case such intensity and/or phase components which are to be attributed to superpositioning of the radiation signal with the intensity-modulated scattered light signal are removed in accordance with applicable addition theorems.

In an embodiment in the second determining step offsetting of the determination results of the first determining step is effected by subtraction of an intensity and/or relative phase for the intensity-modulated scattered light signal for at least one scattered light reference pixel from an intensity and/or a relative phase for the intensity-modulated radiation signal for at least one pixel of the pixel matrix within the imaging portion in accordance with trigonometric addition theorems, and/or in the first determining step offsetting of the measurement values is effected by subtraction of the measurement values from at least one scattered light reference pixel from the measurement values from at least one pixel of the pixel matrix within the imaging portion.

A value is reconstructed or calculated from a detected measurement value, that the corresponding pixel within the imaging portion would have recorded without the occurrence of scattered light. The reconstructed value therefore corresponds to the pure, non-superposed intensity and/or the relative phase of the intensity modulation of the intensity-modulated radiation signal. In general such correction is implemented by subtraction of the values of the scattered light which are determined from the measurement values for the scattered light, that are recorded by the scattered light reference pixels. Alternatively correction is effected by using intensity and phase instead of measurement values, in which case for example in the case of signals of cosine or sine form corresponding trigonometric addition theorems are to be observed as already stated hereinbefore.

In an embodiment in the second determining step offsetting of the determination results of the first determining step is effected in that an intensity for an intensity-modulated scattered light signal and/or a relative phase between the intensity modulation of an intensity-modulated scattered light signal and the reference signal for at least one pixel of the pixel matrix within the imaging portion is interpolated or extrapolated in accordance with trigonometric addition theorems at least from the intensities and/or relative phases determined in the first determining step for two scattered light reference pixels and a corrected intensity of the intensity-modulated radiation signal and/or a corrected relative phase between the intensity modulation of the intensity-modulated radiation signal and a reference signal at least for the pixel within the imaging portion is determined from the intensity and/or relative phase determined in the first determining step for at least the pixel within the imaging portion as well as the intensity and/or relative phase interpolated or extrapolated in the second determining step for at least the pixel within the imaging portion, and/or in the first determining step offsetting of the measurement values is effected in that interpolation values or extrapolation values for an intensity-modulated scattered light signal for at least one pixel of the pixel matrix within the imaging portion are interpolated or extrapolated at least from the measurement values recorded by two scattered light reference pixels and at least the measurement values recorded by the pixel within the imaging portion are corrected with the interpolation values or extrapolation values for the pixel within the imaging portion.

Interpolation in accordance with the present invention is effected just like extrapolation, advantageously with incorporation of weighting or correction factors. Those weighting or correction factors take account of possible differences between the pixels within the imaging portion, that are used for interpolation or extrapolation, or also between the scattered light reference pixels, like differences in relation to the pixels or scattered light reference pixels, for which interpolation or extrapolation is effected. Those weighting factors take account for example of geometrical differences and/or differences in regard to quantum efficiency.

In an embodiment the interpolation and/or extrapolation of measurement values and/or at least one intensity and/or at least one relative phase is effected from measurement values and/or intensities and/or relative phases for at least two scattered light reference pixels for the correction of measurement values and/or the intensity and/or the relative phase for the intensity-modulated radiation signal for at least one pixel of the pixel matrix within the imaging portion on the basis of a linear function which is dependent on the respective spacings of the pixel within the imaging portion from the scattered light reference pixels used for the correction.

If different measurement values for the intensity and/or relative phase of the intensity-modulated scattered light signal are recorded by different scattered light reference pixels, that means that the scattered light signal does not involve a completely homogeneous distribution among those scattered light reference pixels. Accordingly it is generally to be assumed that the distribution also has a comparable degree of non-homogeneity for the pixel matrix. That distribution can be approximated on the assumption that such a non-homogeneity in the case of scattered signals has a locally uniform change with a low gradient. In particular the distribution in that case can be well approximated with a linear interpolation or extrapolation as a function of the distance of the individual pixels within the imaging portion from the scattered light reference pixels which are used for the interpolation or extrapolation operation.

In a further embodiment the correction of an intensity and/or a relative phase for the intensity-modulated radiation signal for at least one pixel of the pixel matrix within the imaging portion is effected by subtraction of the intensity and/or relative phase interpolated or extrapolated from the intensities and/or the relative phases for at least two scattered light reference pixels in accordance with trigonometric addition theorems, and/or the correction of measurement values of at least one pixel of the pixel matrix within the imaging portion is effected by subtraction of the interpolation values or extrapolation values interpolated or extrapolated from the measurement values from at least two scattered light reference pixels.

In order to obtain from the superposed measurement values of an intensity-modulated signal, values for the non-superposed intensity-modulated radiation signal, that is to say in order to correct those measurement values, the superposing components are removed from the detected measurement values. The superposing components in application situations according to the invention involve for example intensities and/or relative phases of the intensity modulations of intensity-modulated scattered light signals. Those intensities and/or relative phases can be well approximated by means of the measurement values recorded by the scattered light reference pixels.

In that respect it is in particular conceivable that the intensities recorded by the pixels within the imaging portion and/or the relative phases of the intensity modulations of the incident radiation are corrected as described above with the intensities recorded by the scattered light reference pixels and/or the relative phases of the intensity modulations of intensity-modulated scattered light signals. More precisely, measurement values for the intensities and/or relative phases are respectively recorded by the pixels within the imaging portion and the scattered light reference pixel, and from those measurement values the determining device first determines the corresponding intensities and/or relative phases. Correction is then also effected by the determining device on the basis of those determined intensities and/or relative phases. Correction can be effected by way of resolving addition theorems.

It is however equally conceivable that the measurement values recorded by the pixels within the imaging portion, for the incident radiation, are corrected as described above with measurement values from the scattered light reference pixels. If the correction of the measurement values is effected on the basis of subtraction of interpolated or extrapolated values then that as a first order represents a good approximation for further determination of the intensity and/or the relative phase between the intensity modulation of the intensity-modulated radiation signal and the reference signal without scattered light superimpositions. With the corrected values the determining device then determines the corresponding intensities and/or relative phases.

In the course of an embodiment the intensity and/or the relative phase of the intensity-modulated radiation signal is corrected for all pixels of the pixel matrix within the imaging portion of the detector. In the case of scattered intensity-modulated signals it is generally to be assumed that all pixels of the pixel matrix are acted upon with an intensity-modulated scattered light signal and thus defective measurement values are recorded for the intensities and/or the relative phases of the intensity-modulated radiation signal. In such a case therefore the distance information of all image portions is erroneous. To acquire an overall image which is error-free or as correct as possible it is necessary for the measurement values or the intensity and/or relative phase of the intensity-modulated radiation signal to be corrected for all pixels of the pixel matrix within the imaging portion.

Finally, in an embodiment, correction is effected using all measurement values, recorded by the scattered light reference pixels, for the intensity-modulated scattered light signal. When using all measurement values, recorded by the scattered light reference pixels, for the intensity-modulated scattered light signal, it is possible for the distribution of the scattered light signal for the pixel matrix to be determined or approximated as accurately as possible.

Further advantages, features and possible uses of the present invention will be clearly apparent from the following description of preferred embodiments and the accompanying Figures in which:

FIG. 2b shows a diagrammatic view of signal determination for the detector of FIG. 2a.

FIG. 1 is a diagrammatic view of a measuring arrangement including an apparatus 1 according to the invention for detecting and determining an intensity and/or a phase of the intensity modulation of an incident intensity-modulated electromagnetic radiation signal 2.

Figure 1:
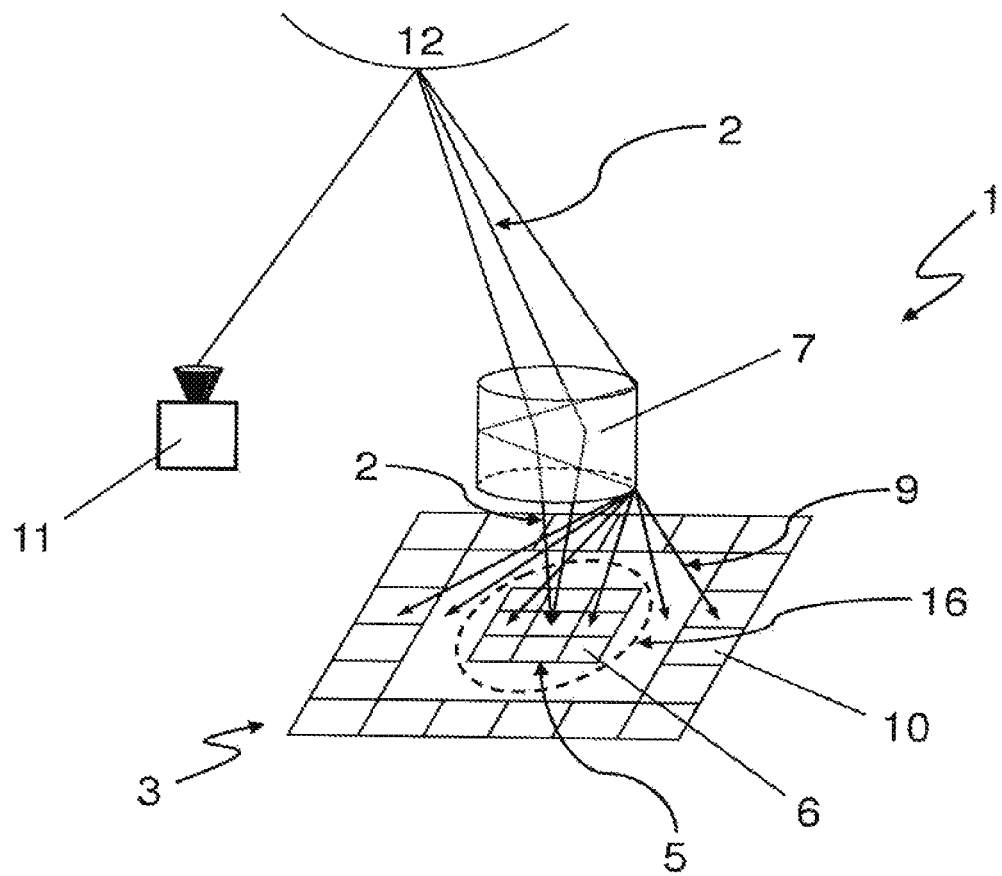
FIG. 1 shows a diagrammatic view of an apparatus according to the invention.

The Figure shows a transmitter 11 which emits intensity-modulated electromagnetic radiation which is reflected by an ambient object 12 in the direction of the apparatus 1. The incident intensity-modulated electromagnetic radiation signal 2 is imaged by the imaging optical means 7 on to an imaging portion 16 of a detector 3 disposed behind same. Arranged within the imaging portion 16 of the detector 3, on to which the intensity-modulated electromagnetic radiation signal 2 is imaged, is a pixel matrix 5 having a plurality of pixels 6 or picture elements.

In the present case the pixel matrix 5 is of a square configuration and includes per row and line the same respective number of individual pixels 6. In the illustrated example there are three times three, that is to say in total nine square pixels 6 of the same structure.

Arranged spaced from the pixel matrix 5 are scattered light reference pixels 10 which are preferably all of the same structure as the pixels 6 of the pixel matrix 5. In this case the scattered light reference pixels 10 are arranged in directly mutually adjoining relationship along the periphery of the pixel matrix 5 in such a way that they completely enclose same. The square pixel matrix 5 is arranged at the center of the square, on the edges of which the scattered light reference pixels 10 are arranged, wherein the sides of the square enclosed by the scattered light reference pixels 10 are respectively parallel to a side of the square formed by the pixel matrix 5. Ideally, intensity-modulated electromagnetic radiation signals 2 are focused by the imaging optical means 7 when the signals are reflected as shown by the same point of the reflecting object, ideally being imaged on to the same pixel 6 of the pixel matrix 5.

It will be noted however that in the case of non-ideal optical means a part of the incident intensity-modulated radiation signal 2 is scattered by the imaging optical means 7 in the form of an intensity-modulated electromagnetic scattered light signal 9 both on to the pixels 6 of the pixel matrix 5 and also on to the scattered light reference pixels 10 and the region between the pixel matrix 5 and the scattered light reference pixels 10.

If the intensity-modulated radiation signal 2 which is reflected by the object 12 or another source, even outside the FOV, is therefore reflected for example on to the edge of the imaging optical means 7 that can involve partial scattering of the intensity-modulated electromagnetic radiation signal 2 by the imaging optical means 7. In other words, in such a non-ideal case, in contrast to the idealized imaging properties of the imaging optical means 7, the intensity-modulated electromagnetic radiation signal 2 is not imaged by the imaging optical means 7 on to the imaging portion 16 of the detector 3, but is rather scattered in the form of intensity-modulated electromagnetic scattered light signal 9 on to the detector 3. In that case the intensity-modulated electromagnetic scattered light signal 9 is also generally scattered on to regions beyond the pixel matrix 5 and the imaging portion 16. Such an intensity-modulated scattered light signal 9 is recorded by the scattered light reference pixels 10 which in the case of an ideal imaging optical means 7 are outside the field of view of the optical means, that is to say they are not subjected to any electromagnetic radiation.

By means of the measurement values, recorded by the scattered light reference pixels 10, for the intensities of the intensity-modulated scattered light signal 9 and/or relative phases between the intensity modulation of the intensity-modulated scattered light signal 9 and a reference signal, it is possible to interpolate or extrapolate the distribution of the intensities and/or the relative phase of the intensity modulation of the intensity-modulated electromagnetic scattered light signal 9 also for the pixel matrix 5 of the detector 3, that is to say also for the individual pixels 6 of the pixel matrix 5 within the imaging portion 16. By means of that interpolated or extrapolated distribution, it is possible for the measurement values, recorded by the pixels 6 of the pixel matrix 5, for the intensity and/or the relative phase between the intensity modulation of the intensity-modulated radiation signal 2 and a reference signal, to be corrected in regard to first-order scattered light disturbances by calculating out scattered light components.

The method of ascertaining the scattered light signal 9 which is also recorded by the pixels 6 of the pixel matrix 5 is not limited to the case shown in FIG. 1 of scattered light signal production as a consequence of scattering at the edge of the imaging optical means 7. The arrangement shown in FIG. 1 and the method employed are equally suitable for correcting further kinds of scattered light signal production by the imaging optical means 7. That applies in particular also to scattered light signal production as a consequence of non-ideal lens properties in the imaging optical means 7, like for example scattering at a flaw in the imaging optical means 7.

Figure 2A:
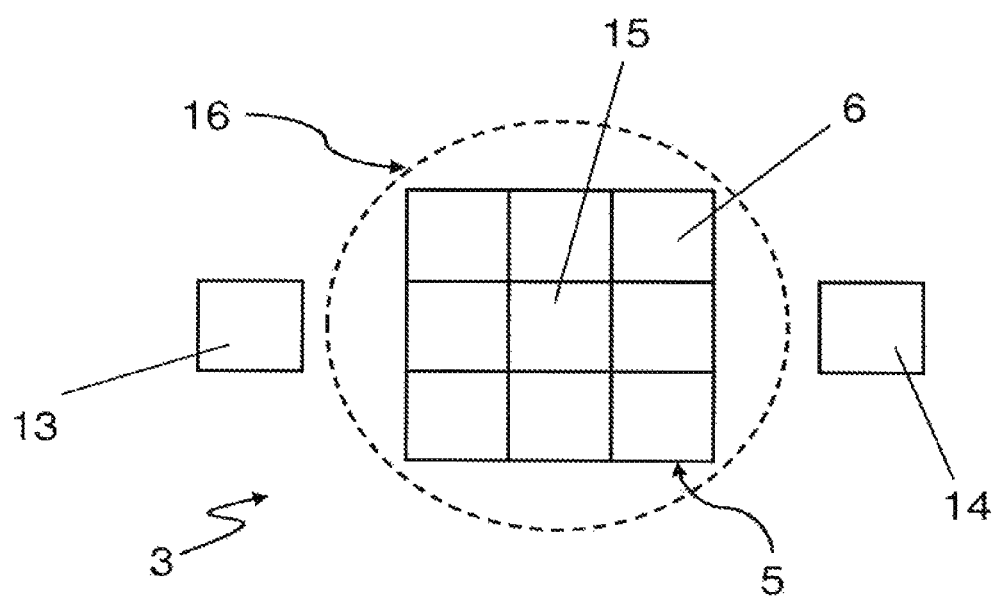
FIG. 2a shows a diagrammatic view of a detector according to the invention.

FIG. 2a shows a diagrammatic plan view of a further detector 3 according to the invention. A pixel matrix 5 is to be seen at the center of the illustration. The pixel matrix 5 comprises nine square pixels 6 of the same structure which are arranged in a square matrix with three lines and three columns. A central pixel 15 is disposed at the center of the pixel matrix 5. The pixel matrix 5 itself is disposed within the imaging portion 16 of the detector 3, on to which the imaging optical means 7 ((not shown) projects the intensity-modulated radiation signal 2 (not shown). The imaging portion 16 is circular and is so arranged that its center point coincides with the center point of the matrix 5, that is to say the center point of the central pixel 15. The radius of the circular imaging portion 16 of the detector 3 is so selected that it is greater than half the length of the diagonal from one corner of the pixel matrix 5 to the opposite corner. Thus the pixel matrix 5 is completely within the imaging portion 16.

A respective scattered light reference pixel 13 and 14 is arranged spaced at the left and the right from the pixel matrix 5. The spacing between the scattered light reference pixels 13, 14 and the pixel matrix 5 is respectively so selected that the scattered light reference pixels 13, 14 are arranged outside the imaging portion 16 of the detector 3. The center points of the left-hand scattered light reference pixel 13, the right-hand scattered light reference pixel 14 and the central pixel 15 of the pixel matrix 5 lie on a common straight line. In that respect the spacing between the center point of the left-hand scattered light reference pixel 13 and the central pixel 15 is equal to the spacing between the central pixel 15 and the right-hand scattered light reference pixel 14. In addition all pixels 6 of the pixel matrix 5 are of the same structure as the two scattered light reference pixels 13 and 14. As the two scattered light reference pixels 13, 14 are arranged outside the imaging portion 16, no intensity-modulated electromagnetic radiation signal 2 (not shown) is imaged on to same by the imaging optical means 7 (not shown). The intensity-modulated electromagnetic radiation signal 2 (not shown) is imaged exclusively on to the imaging portion 16 of the detector 3. However, by virtue of the scatter, it can happen that an intensity-modulated electromagnetic scattered light signal 9 (not shown) is scattered by the imaging optical means 7 (not shown) on to one of the two scattered light reference pixels 13, 14 or on to both.

Figure 2B:
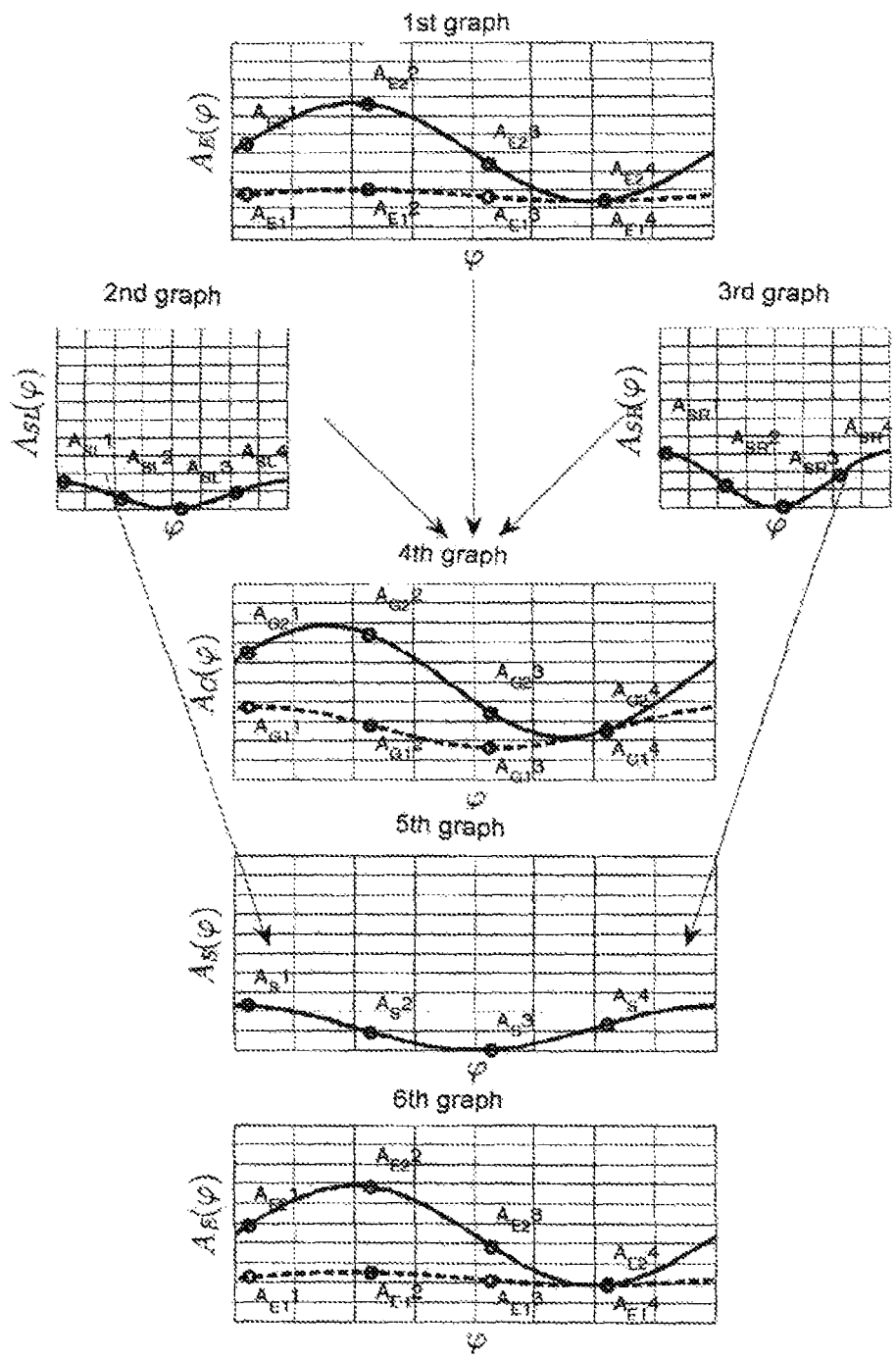

FIG. 2b shows six graphs representing different intensity-modulated signals which are recorded by different pixels 13, 14, 15, and the processing of those signals. The phase $\phi$ of the intensity modulation of the corresponding signal is respectively plotted on the abscissa and the amplitude of the intensity modulation of the corresponding signal is plotted on the ordinate.

Graph 1 shows the intensity-modulated electromagnetic radiation signal $A_E(\phi)$ imaged on to the central pixel 15 of the pixel matrix 5. This is the undisturbed signal which the pixel 15 would record in the case of an ideal imaging optical means 7. In this case the graph shows both a signal pattern for a strong signal by means of a solid line and also a signal pattern for a weak signal with a broken line. Graph 4 shows the actual intensity-modulated radiation signal $A_G(\phi)$ recorded by the central pixel 15. That intensity-modulated radiation signal $A_G(\phi)$ is composed of the intensity-modulated electromagnetic radiation signal $A_E(\phi)$ shown in Graph 1 and an intensity-modulated electromagnetic scattered light signal $A_S(\phi)$ scattered on to the central pixel 15.

In the case of the detector arrangement in FIG. 2a and a linear distribution of the intensity-modulated scattered light signal 9 by way of the detector 3 the intensity-modulated electromagnetic scattered light signal $A_S(\phi)$ scattered on to the central pixel 15 corresponds as a good approximation to the arithmetic mean value of the intensity-modulated electromagnetic scattered light signals $A_{SL}(\phi)$ and $A_{SR}(\phi)$ scattered on to the left-hand scattered light reference pixel 13 and the right-hand scattered light reference pixel 14. The scattered intensity-modulated electromagnetic scattered light signals $A_{SL}(\phi)$ and $A_{SR}(\phi)$ detected by the left-hand and right-hand scattered light reference pixels 13, 14 are shown in Graph 2 and Graph 3 respectively in FIG. 2b. The arithmetic mean value for the intensity-modulated scattered light signal $A_S(\phi)$ which is scattered on to the central pixel 15 is shown in Graph 5. Subtraction of the interpolated scattered light signal $A_S(\phi)$ shown in Graph 5 from the intensity-modulated radiation signal $A_G(\phi)$ detected by the central pixel 15 in Graph 4 gives the corrected intensity-modulated radiation signal $A_E(\phi)$ shown in Graph 6. That intensity-modulated electromagnetic radiation signal $A_E(\phi)$ shown in Graph 6, after the scattered light correction, is identical to the intensity-modulated radiation signal $A_E(\phi)$ in Graph 1, which in the case of an ideal imaging optical means 7 is imaged on to the central pixel 15.

In particular Graph 4 shows that the relative change in the detected intensity-modulated radiation signals $A_G(\phi)$, by virtue of an intensity-modulated scattered light signal $A_S(\phi)$, for a weak intensity-modulated radiation signal $A_E(\phi)$, can be substantially greater than for a strong signal $A_E(\phi)$. Thus, by virtue of the scattered light, the maximum amplitude $A_{0E}$ of the weak signal $A_E(\phi)$ is increased for example by more than 200% whereas the maximum amplitude $A_{0E}$ of the strong signal $A_E(\phi)$ increases by only about 25%. However the phase position of the detected weak and the detected strong signal $A_G(\phi)$ is also respectively shifted to differing degrees with respect to the phase position of the weak and the strong intensity-modulated radiation signal $A_E(\phi)$ respectively. If for example the positions of the maximum or the minimum of weak and strong intensity-modulated radiation signal $A_E(\phi)$ in Graph 1 are compared together it will be seen that the phase positions of the maxima and minima respectively are identical. In Graph 4 the phase positions of the maxima and minima of the detected weak and the detected strong signal $A_G(\phi)$ are respectively no longer identical. Rather the maxima and the minima are spaced from each other. In that case the phase position of the maximum and the minimum respectively of the detected weak signal $A_G(\phi)$ is shifted markedly further with respect to the phase position of the maximum and the minimum respectively of the weak intensity-modulated radiation signal $A_E(\phi)$, than is the case for the phase position of the maximum and the minimum of the detected strong signal $A_G(\phi)$.

The signals shown in Graphs 1 through 6 all involve sinusoidal intensity modulation. That permits derivation of the intensity-modulated electromagnetic radiation signal $A_E(\phi)$ after the scattered light correction of Graph 6 in two different ways.

On the one hand, calculation can be effected by means of trigonometric addition theorems. The intensity-modulated scattered light signal $A_S(\phi)$ for the central pixel 15 of the pixel matrix 5 can be interpolated mathematically from the intensity-modulated scattered light signals $A_{AL}(\phi)$ and $A_{SR}(\phi)$ for the left-hand and the right-hand scattered light reference pixels 13 and 14 using the trigonometric addition theorems, as an arithmetic mean value.

The phase-dependent amplitude $A_S(\phi)$ of the intensity-modulated scattered light signal 9 which is scattered by the imaging optical means 7 on to the central pixel 15, with the maximum amplitude $A_{0S}$ and the initial phase $\phi_{0S}$ can be interpolated as a good approximation with the arithmetic mean from the intensity-modulated scattered light signals $A_{SL}(\phi)$ and $A_{SR}(\phi)$ of the left-hand and right-hand scattered light reference pixels 13 and 14 respectively. The intensity-modulated radiation signal 2 actually detected by the central pixel 15 is a superpositioning of an intensity-modulated radiation signal $A_E(\phi)$ and an intensity-modulated scattered light signal $A_S(\phi)$. As the left-hand and the right-hand scattered light reference pixels 13 and 14 are both arranged outside the imaging portion 16 of the detector 3 only a respective one intensity-modulated electromagnetic scattered light signal $A_{SL}(\phi)$, $A_{SR}(\phi)$ is detected thereby, as shown in Graphs 2 and 3. If therefore two intensity-modulated scattered light signals $A_{SL}(\phi)$, $A_{SR}(\phi)$ as well as an intensity-modulated radiation signal $A_G(\phi)$ which is a superpositioning of an intensity-modulated radiation signal $A_E(\phi)$ and an intensity-modulated scattered light signal $A_S(\phi)$ are therefore detected. The intensity-modulated scattered light signal $A_S(\phi)$ of the superpositioning is approximated by interpolation from the two detected intensity-modulated scattered light signals $A_{SL}(\phi)$, $A_{SR}(\phi)$. The intensity-modulated radiation signal $A_E(\phi)$ of the superpositioning is calculated as a good approximation by subtraction of the interpolated intensity-modulated scattered light signal $A_S(\phi)$ from the detected superpositioning signal $A_G(\phi)$.

Determination of the intensity-modulated radiation signal $A_E(\phi)$ to be detected, by the determining device (not shown) can thus be effected on the one hand by determining firstly the amplitudes $A_{0G}$, $A_{0SL}$ and $A_{0SR}$ as well as the phases $\phi_{0G}$, $\phi_{0SL}$ and $\phi_{0SR}$ of the signals $A_G(\phi)$, $A_{SL}(\phi)$ and $A_{SR}(\phi)$ from the measurement values detected by the central pixel 15 and the scattered light reference pixels 13 and 14. Then, as described above, the amplitude $A_{0E}$ and/or the phase $\phi_{0E}$ of the intensity-modulated radiation signal $A_E(\phi)$ to be detected are then determined using trigonometric addition theorems from those amplitudes $A_{0G}$, $A_{0SL}$, $A_{0SR}$ and phases $\phi_{0G}$, $\phi_{0SL}$, $\phi_{0SR}$.

Equally however it is also possible to directly interpolate by means of the determining device (not shown), from the measurement values, that is to say the raw data, of the left-hand and right-hand scattered light reference pixel 13 and 14 respectively, by the formation of arithmetic mean values, values for the intensity-modulated scattered light signal also detected by the central pixel 15. Those interpolated values are subtracted from the measurement values, that is to say the raw data, which the central pixel 15 records. The result of that subtraction is corrected values for the intensity-modulated signal $A_E(\phi)=A_{0E}\cdot\sin(\phi+\phi_{0E})$ to be detected, which can be determined from those corrected values. In particular, from those corrected values, it is possible to determine the amplitude $A_{0E}$ and/or the phase $\phi_{0E}$ of the intensity-modulated radiation signal $A_E(\phi)$ to be detected. That variant for correction of the measured signal by means of the raw data has the advantage that it is to be implemented by simple subtraction.

In the example of FIG. 2b, for each signal, four support locations, that is to say in relation to the measured signals, measurement values, are marked, which are spaced from each other by 90° and which are arranged at the same time in all graphs. It will be appreciated that here those support locations are given only by way of example. It would also be possible to select more or fewer support locations, in which respect at least two support locations spaced from each other by 90° are required to detect the phase position.

The support locations are identified in the graphs by the letter "A" and are consecutively numbered as 1 through 4. In that respect the index denotes the respective signal being considered. In Graphs 1, 4 and 6, the additional numerical index denotes the weak signal ("1") and the strong signal ("2").

For better understanding, consideration is set out in detail hereinafter as to how, referring to four measurement values $A_{G2}1$ through $A_{G2}4$, falsified by the scattered light, at the pixel 15 of the pixel matrix 5 for the strong signal (solid line in Graph 4 in FIG. 2b), the associated four unfalsified values $A_{E2}1$ through $A_{E2}4$ in Graph 4 is obtained. On the assumption that the intensity of the scattered light falls linearly between the left-hand and the right-hand scattered light reference pixels 13, 14, it follows from the measurements of the scattered light at the left-hand scattered light reference pixel 13 $A_{SL}1$ through $A_{SL}4$ (Graph 2) and the measurement values at the same time in respect of the right-hand scattered light reference pixel 14 $A_{SR}1$ through $A_{SR}4$ (Graph 3) for the intensity $A_S1$ through $A_S4$ of the scattered light on the central pixel 15 of the pixel matrix 5 (Graph 5):

$$A_S n = \frac{1}{2} * (A_{SL}n + A_{SR}n),$$

wherein n=1, 3 . . . , 4 denotes a respective support location.

Then those values $A_S1$ through $A_S4$ for the interpolated scattered light intensity at the pixel 15 are subtracted from the measurement values $A_{G2}1$ through $A_{G2}4$ of the falsified measured signal at the pixel 15 of the pixel matrix 5. That then gives the unfalsified values $A_{E2}1$ through $A_{E2}4$ in Graph 6. The phase and the amplitude of the corrected reception signal can be determined from them, as $$\text{phase } E2 = \arctan\left[(A_{E1}1 - A_{E1}3)/(A_{E1}2 - A_{E1}4)\right]$$

and $$\text{amplitude } E2 = \frac{1}{2} * \text{SQRT}[(A_{E1}1 - A_{E1}3)^2 + (A_{E1}2 - A_{E1}4)^2],$$

wherein SQRT denotes the root and ^2 denotes the square.

The corrected values at the support locations 1 through 4 for the weak signal can be similarly calculated.

For the purposes of the original disclosure it is pointed out that all features as can be seen by a man skilled in the art from the present description, the drawings and the attached claims, even if they are described in specific terms only in connection with certain other features, can be combined both individually and also in any combination with others of the features or groups of features disclosed here insofar as that has not been expressly excluded or technical aspects makes such combinations impossible or meaningless. A comprehensive explicit representation of all conceivable combinations of features and emphasis of the independence of the individual features from each other is dispensed with here only for the sake of brevity and readability of the description.

LIST OF REFERENCES 1 apparatus for determining an intensity and/or phase of the intensity modulation
2 intensity-modulated electromagnetic radiation signal
3 detector
5 pixel matrix
6 pixel of the pixel matrix
7 imaging optical means
9 intensity-modulated electromagnetic scattered light signal
10 scattered light reference pixel
11 transmitter
12 object
13 left-hand scattered light reference pixel
14 right-hand scattered light reference pixel 15 central pixel of the pixel matrix
16 imaging portion of the detector
ϕ phase of the intensity modulation
$A_E(\phi)$ intensity-modulated radiation signal to be detected for the pixel 15
$A_{SL}(\phi)$ intensity-modulated scattered light signal for the scattered light pixel 13
$A_{SR}(\phi)$ intensity-modulated scattered light signal for the scattered light pixel 14
$A_S(\phi)$ intensity-modulated scattered light signal for the pixel 15
$A_G(\phi)$ scattered light-superposed intensity-modulated radiation signal for the pixel 15

The invention claimed is:

1. An apparatus (1) for determining an intensity of an intensity-modulated electromagnetic radiation signal (2), comprising:
   a detector (3), wherein the detector (3) has a pixel matrix (5), and
   an imaging optical means (7) for imaging an intensity-modulated radiation signal (2) onto the detector (3),
   wherein the imaging optical means (7) in operation illuminates an imaging portion (16) of the detector (3) with the imaged intensity-modulated radiation signal (2) and
   wherein the pixel matrix (5) is arranged at least portion-wise within the imaging portion (16) of the detector (3) and has a plurality of pixels (6) which are so adapted that in operation they record measurement values for the intensity-modulated radiation signal (2),
   characterised in that the apparatus (1) has at least one scattered light reference pixel (10) arranged outside the imaging portion (16) of the detector (3) and so adapted that in operation the at least one scattered light reference pixel (10) records measurement values for an intensity-modulated scattered light signal (9) which is propagated within the imaging optical means and which is based on the intensity-modulated electromagnetic scattered light signal (2), and
   a determining device so adapted that in operation the determining device processes measurement values from at least one pixel (6) of the pixel matrix (5) within the imaging portion (16) as a first data input and measurement values from at least one scattered light reference pixel (10) as a second data input in such a way that:
   a) in a first determining step the determining device determines from the first data input an intensity for the intensity-modulated radiation signal (2) at least for the pixel (6) within the imaging portion (16) and from the second data input an intensity of the intensity-modulated scattered light signal (9) at least for the scattered light reference pixel (10) and in a second determining step the determining device offsets the intensity for the intensity-modulated radiation signal (2) and the intensity of the intensity-modulated scattered light signal (9) determined in the first determining step with each other in such a way that the determining device provides a corrected intensity of the intensity-modulated radiation signal (2) at least for the pixel (6) within the imaging portion (16) and provides the corrected intensity of the intensity-modulated radiation signal (2) as a data output, or
   b) in a first determining step the determining device offsets the first and second data inputs with each other in such a way that the determining device determines corrected measurement values at least for the pixel (6) within the imaging portion (16) and in a second determining step determines from the corrected measurement values of the first determining step a corrected intensity of the intensity-modulated radiation signal (2) at least for the pixel (6) within the imaging portion (16) and provides the corrected intensity of the intensity-modulated radiation signal (2) as a data output.

2. Apparatus (1) as set forth in claim 1, characterised in that the scattered light reference pixel (10) is arranged outside the plane in which the pixel matrix (5) is arranged.

3. Apparatus (1) as set forth in claim 1, characterised in that the scattered light reference pixel (10) is arranged at the imaging optical means.

4. Apparatus (1) as set forth in claim 1, characterised in that the scattered light reference pixel (10) and the pixel matrix (5) are arranged in the same plane, wherein the pixel matrix (5) has a first portion (4) within the imaging portion (16) and a second portion (8) outside the imaging portion (16), and wherein at least one of the pixels (6) within the second portion (8) is a scattered light reference pixel (10).

5. Apparatus (1) as set forth in claim 1, characterised in that there is provided a plurality of scattered light reference pixels (10), wherein the scattered light reference pixels (10) are arranged or distributed at equal angular spacings about the center point of the pixel matrix (5).

6. A method of reducing scattered light influences on intensity determination of the intensity modulation of an intensity-modulated electromagnetic radiation signal (2), comprising the steps:
   imaging the intensity-modulated radiation signal (2) onto a detector (3),
   wherein the imaging optical means (7) illuminates an imaging portion (16) of the detector (3) with the imaged intensity-modulated radiation signal (2),
   recording the imaged intensity-modulated radiation signal (2) with a pixel matrix (5) of the detector (3),
   wherein the pixel matrix (5) of the detector (3) is arranged at least portion-wise within the imaging portion (16) and has a plurality of pixels (6) which are so adapted that in operation they record measurement values for the intensity-modulated radiation signal (2),
   characterised in that the method comprises the following additional steps:
   recording an intensity-modulated scattered light signal (9) which is propagated within the imaging optical means and which is based on the intensity-modulated electromagnetic radiation signal (2) with at least one scattered light reference pixel (10) of the apparatus (1), on to which the intensity-modulated scattered light signal (9) is scattered,
   wherein the scattered light reference pixel (10) is arranged outside the imaging portion (16) of the detector (3) and is so adapted that in operation it records measurement values for the intensity-modulated scattered light signal (9), and
   determining a corrected intensity of the intensity-modulated radiation signal (2) for at least one pixel (6) of the pixel matrix (5) within the imaging portion (16),
   wherein the determining operation includes:
   a) a first determining step in which an intensity for the intensity-modulated radiation signal (2) at least for the pixel (6) within the imaging portion (16) is determined at least from the measurement values from the pixel (6) within the imaging portion (16) and an intensity of the intensity-modulated scattered light signal (9) at least for the scattered light reference pixel (10) is determined at least from the measurement values from a scattered light reference pixel (10), and a second determining step in which the intensity for the intensity-modulated radiation signal (2) and the intensity of the intensity-modulated scattered light signal (9) determined in the first determining step are so offset with each other that a corrected intensity of the intensity-modulated radiation signal (2) at least for the pixel (6) within the imaging portion (16) is determined, or b) a first determining step in which at least the measurement values from the pixel (6) within the imaging portion (16) and at least the measurement values from the scattered light reference pixel (10) are so offset with each other that corrected measurement values at least for the pixel (6) within the imaging portion (16) are determined, and a second determining step in which a corrected intensity of the intensity-modulated radiation signal (2) at least for the pixel (6) within the imaging portion (16) is determined from the corrected measurement values of the first determining step.

7. A method as set forth in claim 6, characterised in that in the second determining step offsetting of the intensity for the intensity-modulated radiation signal (2) and the intensity of the intensity-modulated scattered light signal (9) determined in the first determining step is effected by subtraction of an intensity for at least one scattered light reference pixel (10) from an intensity for the intensity-modulated radiation signal (2) for at least one pixel (6) of the pixel matrix (5) within the imaging portion (16) in accordance with trigonometric addition theorems, and/or in the first determining step offsetting of the measurement values is effected by subtraction of the measurement values from at least one scattered light reference pixel (10) from the measurement values from at least one pixel (6) of the pixel matrix (5) within the imaging portion (16).

8. A method as set forth in claim 6, characterised in that in the second determining step offsetting of the intensity for the intensity-modulated radiation signal (2) and the intensity of the intensity-modulated scattered light signal (9) determined in the first determining step is effected in that an intensity for an intensity-modulated scattered light signal (9) for at least one pixel (6) of the pixel matrix (5) within the imaging portion (16) is interpolated or extrapolated in accordance with trigonometric addition theorems at least from the intensities determined in the first determining step for two scattered light reference pixels (10) and a corrected intensity of the intensity-modulated radiation signal (2) at least for the pixel (6) within the imaging portion (16) is determined from the intensity determined in the first determining step for at least the pixel (6) within the imaging portion (16) as well as the intensity interpolated or extrapolated in the second determining step for at least the pixel (6) within the imaging portion (16), and/or in the first determining step offsetting of the measurement values is effected in that interpolation values or extrapolation values for an intensity-modulated scattered light signal (9) for at least one pixel (6) of the pixel matrix (5) within the imaging portion (16) are interpolated or extrapolated at least from the measurement values recorded by two scattered light reference pixels (10) and at least the measurement values recorded by the pixel (6) within the imaging portion (16) are corrected with the interpolation values or extrapolation values for the pixel (6) within the imaging portion (16).

9. A method as set forth in claim 8, characterised in that the interpolation and/or extrapolation of measurement values and/or at least one intensity is effected from measurement values and/or intensities for at least two scattered light reference pixels (10) for the correction of measurement values and/or the intensity for the intensity-modulated radiation signal (2) for at least one pixel (6) of the pixel matrix (5) within the imaging portion (16) on the basis of a linear function which is dependent on the respective spacings of the pixel (6) within the imaging portion (16) from the scattered light reference pixels (10) used for the correction.

10. A method as set forth in claim 8, characterised in that the correction of an intensity for the intensity-modulated radiation signal (2) for at least one pixel (6) of the pixel matrix (5) within the imaging portion (16) is effected by subtraction of the intensity interpolated or extrapolated from the intensities for at least two scattered light reference pixels (10) in accordance with trigonometric addition theorems, and/or the correction of measurement values of at least one pixel (6) of the pixel matrix (5) within the imaging portion (16) is effected by subtraction of the interpolation values or extrapolation values interpolated or extrapolated from the measurement values from at least two scattered light reference pixels (10).

11. A method of reducing scattered light influences on phase determination of the intensity modulation of an intensity-modulated electromagnetic radiation signal (2), comprising the steps:

imaging the intensity-modulated radiation signal (2) onto a detector (3), wherein the imaging optical means (7) illuminates an imaging portion (16) of the detector (3) with the imaged intensity-modulated radiation signal (2), recording the imaged intensity-modulated radiation signal (2) with a pixel matrix (5) of the detector (3), wherein the pixel matrix (5) of the detector (3) is arranged at least portion-wise within the imaging portion (16) and has a plurality of pixels (6) which are so adapted that in operation they record measurement values for the intensity-modulated radiation signal (2), characterised in that the method comprises the following additional steps:

recording an intensity-modulated scattered light signal (9) which is propagated within the imaging optical means and which is based on the intensity-modulated electromagnetic radiation signal (2) with at least one scattered light reference pixel (10) of the apparatus (1), on to which the intensity-modulated scattered light signal (9) is scattered, wherein the scattered light reference pixel (10) is arranged outside the imaging portion (16) of the detector (3) and is so adapted that in operation it records measurement values for the intensity-modulated scattered light signal (9), and determining a corrected relative phase between the intensity modulation of the intensity-modulated radiation signal (2) and a reference signal for at least one pixel (6) of the pixel matrix (5) within the imaging portion (16), wherein the determining operation includes:

a) a first determining step in which a relative phase between the intensity modulation of the intensity-modulated radiation signal (2) and a reference signal at least for the pixel (6) within the imaging portion (16) is determined at least from the measurement values from the pixel (6) within the imaging portion (16) and a relative phase between the intensity modulation of the intensity-modulated scattered light signal (9) and the reference signal at least for the scattered light reference pixel (10) is determined at least from the measurement values from a scattered light reference pixel (10), and a second determining step in which the relative phase between the intensity modulation of the intensity-modulated radiation signal (2) and the reference signal at least for the pixel (6) and the relative phase between the intensity modulation of the intensity-modulated scattered light signal (9) and the reference signal at least for the scattered light reference pixel (10) determined in the first determining step are so offset with each other that a corrected relative phase between the intensity modulation of the intensity-modulated radiation signal (2) and a reference signal at least for the pixel (6) within the imaging portion (16) is determined, or b) a first determining step in which at least the measurement values from the pixel (6) within the imaging portion (16) and at least the measurement values from the scattered light reference pixel (10) are so offset with each other that corrected measurement values at least for the pixel (6) within the imaging portion (16) are determined, and a second determining step in which a corrected relative phase between the intensity modulation of the intensity-modulated radiation signal (2) and a reference signal at least for the pixel (6) within the imaging portion (16) is determined from the corrected measurement values of the first determining step.

12. A method as set forth in claim 11, characterised in that in the second determining step offsetting of the relative phase between the intensity modulation of the intensity-modulated radiation signal (2) and the reference signal at least for the pixel (6) and the relative phase between the intensity modulation of the intensity-modulated scattered light signal (9) and the reference signal at least for the scattered light reference pixel (10) determined in the first determining step is effected by subtraction of a relative phase for the intensity-modulated scattered light signal (9) for at least one scattered light reference pixel (10) from a relative phase for the intensity-modulated radiation signal (2) for at least one pixel (6) of the pixel matrix (5) within the imaging portion (16) in accordance with trigonometric addition theorems, and/or in the first determining step offsetting of the measurement values is effected by subtraction of the measurement values from at least one scattered light reference pixel (10) from the measurement values from at least one pixel (6) of the pixel matrix (5) within the imaging portion (16).

13. A method as set forth in claim 11, characterised in that in the second determining step offsetting of the relative phase between the intensity modulation of the intensity-modulated radiation signal (2) and the reference signal at least for the pixel (6) and the relative phase between the intensity modulation of the intensity-modulated scattered light signal (9) and the reference signal at least for the scattered light reference pixel (10) determined in the first determining step is effected in that a relative phase between the intensity modulation of an intensity-modulated scattered light signal (9) and the reference signal for at least one pixel (6) of the pixel matrix (5) within the imaging portion (16) is interpolated or extrapolated in accordance with trigonometric addition theorems at least from the relative phases determined in the first determining step for two scattered light reference pixels (10) and a corrected relative phase between the intensity modulation of the intensity-modulated radiation signal (2) and a reference signal at least for the pixel (6) within the imaging portion (16) is determined from the relative phase determined in the first determining step for at least the pixel (6) within the imaging portion (16) as well as the relative phase interpolated or extrapolated in the second determining step for at least the pixel (6) within the imaging portion (16), and/or in the first determining step offsetting of the measurement values is effected in that interpolation values or extrapolation values for an intensity-modulated scattered light signal (9) for at least one pixel (6) of the pixel matrix (5) within the imaging portion (16) are interpolated or extrapolated at least from the measurement values recorded by two scattered light reference pixels (10) and at least the measurement values recorded by the pixel (6) within the imaging portion (16) are corrected with the interpolation values or extrapolation values for the pixel (6) within the imaging portion (16).

14. A method as set forth in claim 13, characterised in that the interpolation and/or extrapolation of measurement values and/or at least one relative phase is effected from measurement values and/or relative phases for at least two scattered light reference pixels (10) for the correction of measurement values and/or the relative phase for the intensity-modulated radiation signal (2) for at least one pixel (6) of the pixel matrix (5) within the imaging portion (16) on the basis of a linear function which is dependent on the respective spacings of the pixel (6) within the imaging portion (16) from the scattered light reference pixels (10) used for the correction.

15. A method as set forth in claim 11, characterised in that the correction of a relative phase for the intensity-modulated radiation signal (2) for at least one pixel (6) of the pixel matrix (5) within the imaging portion (16) is effected by subtraction of the intensity and/or relative phase interpolated or extrapolated from the relative phases for at least two scattered light reference pixels (10) in accordance with trigonometric addition theorems, and/or the correction of measurement values of at least one pixel (6) of the pixel matrix (5) within the imaging portion (16) is effected by subtraction of the interpolation values or extrapolation values interpolated or extrapolated from the measurement values from at least two scattered light reference pixels (10).

16. An apparatus (1) for determining a phase of an intensity modulation of an intensity-modulated electromagnetic radiation signal (2), comprising:

a detector (3), wherein the detector (3) has a pixel matrix (5), and an imaging optical means (7) for imaging an intensity-modulated radiation signal (2) onto the detector (3), wherein the imaging optical means (7) in operation illuminates an imaging portion (16) of the detector (3) with the imaged intensity-modulated radiation signal (2) and wherein the pixel matrix (5) is arranged at least portion-wise within the imaging portion (16) of the detector (3) and has a plurality of pixels (6) which are so adapted that in operation they record measurement values for the intensity-modulated radiation signal (2), characterised in that the apparatus (1) has at least one scattered light reference pixel (10) arranged outside the imaging portion (16) of the detector (3) and so adapted that in operation the at least one scattered light reference pixel (10) records measurement values for an intensity-modulated scattered light signal (9) which is propagated within the imaging optical means and which is based on the intensity-modulated electromagnetic scattered light signal (2), and a determining device so adapted that in operation the determining device processes measurement values from at least one pixel (6) of the pixel matrix (5) within the imaging portion (16) as a first data input and measurement values from at least one scattered light reference pixel (10) as a second data input in such a way that:

a) in a first determining step the determining device determines from the first data input a relative phase between the intensity modulation of the intensity-modulated radiation signal (2) and a reference signal at least for the pixel (6) within the imaging portion (16) and from the second data input a relative phase between the intensity modulation of the intensity-modulated scattered light signal (9) and the reference signal at least for the scattered light reference pixel (10) and in a second determining step the determining device offsets the relative phase between the intensity modulation of the intensity-modulated radiation signal (2) and the reference signal at least for the pixel (6) and the relative phase between the intensity modulation of the intensity-modulated scattered light signal (9) and the reference signal at least for the scattered light reference pixel (10) determined in the first determining step with each other in such a way that the determining device provides a corrected relative phase between the intensity modulation of the intensity-modulated radiation signal (2) and a reference signal at least for the pixel (6) within the imaging portion (16) and provides the corrected relative phase between the intensity modulation of the intensity-modulated radiation signal (2) as a data output, or b) in a first determining step the determining device offsets the first and second data inputs with each other in such a way that the determining device determines corrected measurement values at least for the pixel (6) within the imaging portion (16) and in a second determining step determines from the corrected measurement values of the first determining step a corrected relative phase between the intensity modulation of the intensity-modulated radiation signal (2) and a reference signal at least for the pixel (6) within the imaging portion (16) and provides the corrected intensity of the intensity-modulated radiation signal (2) as a data output.

17. Apparatus (1) as set forth in claim 16, characterised in that the scattered light reference pixel (10) is arranged outside the plane in which the pixel matrix (5) is arranged.

18. Apparatus (1) as set forth in claim 17, characterised in that the scattered light reference pixel (10) is arranged at the imaging optical means.

19. Apparatus (1) as set forth in claim 16, characterised in that the scattered light reference pixel (10) and the pixel matrix (5) are arranged in the same plane, wherein the pixel matrix (5) has a first portion (4) within the imaging portion (16) and a second portion (8) outside the imaging portion (16), and wherein at least one of the pixels (6) within the second portion (8) is a scattered light reference pixel (10).

20. Apparatus (1) as set forth in claim 16, characterised in that there is provided a plurality of scattered light reference pixels (10), wherein the scattered light reference pixels (10) are arranged distributed at equal angular spacings about the center point of the pixel matrix (5).

* * * * *